No. 640,000. Patented Dec. 26, 1899.
F. W. KINNEY.
JOINT FASTENER FOR TIRE WIRES OR BANDS.
(Application filed Oct. 16, 1899.)
(No Model.)
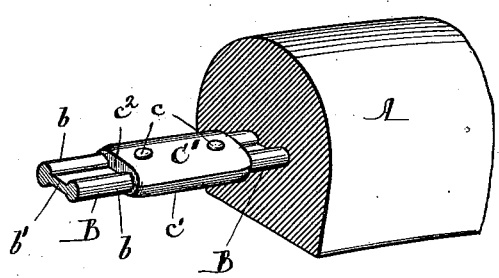
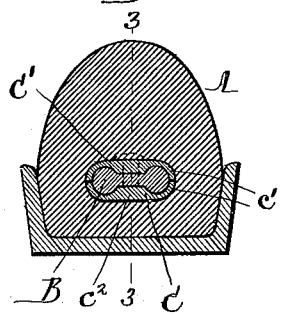
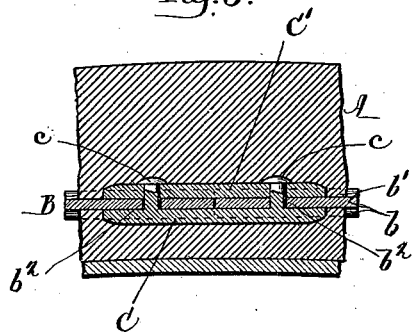
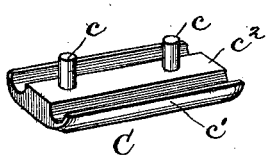
Witnesses:
Fred Gerlach
Katharine Gerlach
Inventor:
Frank W. Kinney
By Price & Fisher
his Attorneys.
THE NORRIS PETERS CO., PHOTO-LITHO., WASHINGTON, D. C.

United States Patent Office.

FRANK W. KINNEY, OF CHICAGO, ILLINOIS, ASSIGNOR, BY MESNE ASSIGN-MENTS, TO THE CALUMET TIRE RUBBER COMPANY, OF SAME PLACE.

JOINT-FASTENER FOR TIRE WIRES OR BANDS.

SPECIFICATION forming part of Letters Patent No. 640,000, dated December 26, 1899.

Application filed October 16, 1899. Serial No. 733,716. (No model.)

*To all whom it may concern:*

Be it known that I, FRANK W. KINNEY, a resident of Chicago, Cook county, Illinois, have invented certain new and useful Improvements in Joint-Fasteners for Tire Wires or Bands, of which the following is a full, clear, and exact description.

In fastening the ends of the wires or bands used in the manufacture of elastic tires for vehicles it is important that the joints shall be such as not only to hold the ends of the wire or band against tensile strain, but also to prevent any lateral movement of the wire, which would tend to speedily chafe and destroy the tire at such point.

The present invention is designed to provide a joint-fastener for tire wires or bands that shall not only securely hold together the opposing ends of the wire or band against tensile strain, but shall securely retain such parts against any danger of lateral shift incident to the strains that are thrown upon the wire or band in use.

The invention consists in the joint-fastener hereinafter described, illustrated in the accompanying drawings, and particularly pointed out in the claim at the end of this specification.

Figure 1 is a perspective view showing part of an elastic tire with its retaining wire or band and having my improved fastener applied thereto. Fig. 2 is a view in vertical longitudinal section through a portion of the elastic tire, showing the wire or band made by my improved fastener. Fig. 3 is a view in vertical cross-section on line 3 3 of Fig. 2. Fig. 4 is a detail perspective view of one of the sections of my improved joint-fastener.

A designates the body of the rubber tire, through which will extend a retaining wire or band B. The body of the band B is formed of the longitudinal thickened edge portions $b$ $b$, united by a thinner central web $b'$, thereby forming central channels at opposite sides of the band or wire between its thickened portions. Each of the ends of the wire or band is formed with one or more holes $b^2$, adapted to receive retaining-pins $c$, that pass through the web, and preferably the pins $c$ are formed integral with one of the sections C or C' of the fastener. Each of the sections C and C' of the fastener is formed with inwardly-extending lateral edges $c'$ and with a central rib $c^2$. The central rib $c^2$ of each section of the fastener will correspond in contour with the channel upon the adjacent side of the band, and the inwardly-turned flanges $c'$ will extend partially around the thickened edge portions $b$ of the wire or band. In order to join the ends of the wire or band B, they will be brought together, as shown in Figs. 1 and 2, and the sections C C' of the fastener will be placed upon opposite sides of the ends of the tire or band, with the pins $c$ passing through the central web of the wire or band. The free ends of the pins $c$ will then be upset or headed, as at $c^3$, and will serve not only to securely unite the ends of the wire or band B, but also to rigidly clamp the sections C C' of the fastener in position. When the fastener is thus in place, the central rib $c^2$ of each section and the inwardly-extending flanges $c'$ will securely hold the ends of the retaining wire or band B against all possibility of lateral movement, thereby giving to the wire or band B the effect of a continuous ring. In practice I prefer to form the sections C C' of the fastener of drop-forgings, although manifestly this is not essential.

Having thus described my invention, what I claim as new, and desire to secure by Letters Patent, is—

In a vehicle-tire, the combination with the retaining band or wire B having thickened portions and channels upon its opposite sides and having its ends provided with holes to receive the retaining-pins, of the joint-fastener comprising the opposite sections C and C' having inwardly-extending side flanges and having intermediate longitudinal ribs to enter the channels of the band or wire and having pins for uniting said sections C and C' together, said pins passing through the holes in the ends of the band, substantially as described.

FRANK W. KINNEY.

Witnesses:
GEO. P. FISHER, Jr.,
ALBERTA ADAMICK.